US012505496B2

(12) United States Patent
Isgar (10) Patent No.: US 12,505,496 B2
(45) Date of Patent: Dec. 23, 2025

(54) SYSTEM FOR INTERACTION REGARDING REAL ESTATE SALES

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

(21) Appl. No.: 18/178,632

(22) Filed: Mar. 6, 2023

(65) Prior Publication Data

US 2023/0206362 A1    Jun. 29, 2023

Related U.S. Application Data

(63) Continuation of application No. 16/738,284, filed on Jan. 9, 2020, now abandoned.
(60) Provisional application No. 62/790,243, filed on Jan. 9, 2019.

(51) Int. Cl.
| | | |
|---|---|---|
| *G06Q 50/16* | (2024.01) | |
| *G06F 3/04815* | (2022.01) | |
| *G06T 19/00* | (2011.01) | |
| *H04W 4/021* | (2018.01) | |
| *H04W 4/029* | (2018.01) | |

(52) U.S. Cl.
CPC ....... *G06Q 50/165* (2013.01); *G06F 3/04815* (2013.01); *G06T 19/006* (2013.01); *H04W 4/021* (2013.01); *H04W 4/029* (2018.02)

(58) Field of Classification Search
CPC ...... G06Q 50/16; G06Q 50/165; G06Q 50/01; G06K 9/00671; H04M 2203/359; G06F 3/04815; G06T 19/006; H04W 4/021; H04W 4/029

See application file for complete search history.

(56) References Cited

U.S. PATENT DOCUMENTS

| | | |
|---|---|---|
| 8,160,304 B2 | 4/2012 | Rhoads et al. |
| 8,878,750 B1 | 11/2014 | Park et al. |
| 9,679,325 B2 | 6/2017 | Nallu et al. |

(Continued)

OTHER PUBLICATIONS

Liu, Chengbi, and Sven Fuhrmann. "Enriching the GIScience research agenda: Fusing augmented reality and location-based social networks." Transactions in GIS 22.3 (2018): 775-788. (Year: 2018).*

(Continued)

*Primary Examiner* — Brendan S O'Shea
(74) *Attorney, Agent, or Firm* — Schmeiser, Olsen & Watts LLP (57) ABSTRACT

Described is a system for interaction regarding real estate sales based on geolocation. The system includes a server having a memory storing geo-grouped property data and a user computing device coupled to the server. The server may programmed to receive location information from the user computing device to automatically determine a property(ies) near a location of the user computing device. The server automatically finds and retrieves geo-grouped property data corresponding to the property and automatically delivers the geo-grouped data to the user computing device for direct access, and receive and store a post from the user computing device as part of the geo-grouped property data. The system allows users to interact with each other based on geolocation of a particular property that interests the different users, wherein such interaction does not need to be between preestablished connections of users.

9 Claims, 8 Drawing Sheets

(56) References Cited

U.S. PATENT DOCUMENTS

| | | | |
|---|---|---|---|
| 11,757,817 B1 * | 9/2023 | Cheng | H04W 4/023 |
| | | | 455/456.3 |
| 2008/0147730 A1 | 6/2008 | Lee et al. | |
| 2009/0286572 A1 | 11/2009 | Rhoads et al. | |
| 2010/0008265 A1 | 1/2010 | Freer | |
| 2010/0293106 A1 | 11/2010 | Rhoads et al. | |
| 2010/0318451 A1 | 12/2010 | Niccolini et al. | |
| 2012/0208551 A1 | 8/2012 | Hill | |
| 2012/0240077 A1 | 9/2012 | Vaittinen et al. | |
| 2013/0027227 A1 | 1/2013 | Nordstrom | |
| 2013/0073389 A1 | 3/2013 | Heath | |
| 2013/0346240 A1 | 12/2013 | Roberts | |
| 2014/0079320 A1 | 3/2014 | Hamming et al. | |
| 2014/0100994 A1 | 4/2014 | Tatzel et al. | |
| 2014/0143004 A1 | 5/2014 | Abhyanker | |
| 2014/0168056 A1 | 6/2014 | Swaminathan et al. | |
| 2014/0171039 A1 | 6/2014 | Bjontegard | |
| 2014/0228056 A1 | 8/2014 | Busch | |
| 2014/0279018 A1 | 9/2014 | Hardin et al. | |
| 2014/0330814 A1 | 11/2014 | Li | |
| 2015/0074570 A1 | 3/2015 | Takimoto et al. | |
| 2015/0199436 A1 | 7/2015 | Bailey et al. | |
| 2015/0206218 A1 | 7/2015 | Banerjee et al. | |
| 2016/0098755 A1 | 4/2016 | Silvestro et al. | |
| 2016/0127485 A1 | 5/2016 | Tseng et al. | |
| 2016/0169696 A1 | 6/2016 | Butts et al. | |
| 2017/0032421 A1 | 2/2017 | Semple | |
| 2017/0090695 A1 | 3/2017 | Pierce et al. | |
| 2017/0163655 A1 | 6/2017 | Ramalingam et al. | |
| 2018/0144524 A1 | 5/2018 | Lotto et al. | |
| 2018/0196819 A1 | 7/2018 | Zhang et al. | |
| 2018/0232787 A1 | 8/2018 | Dupray | |
| 2018/0249063 A1 | 8/2018 | Averianov et al. | |
| 2018/0253145 A1 | 9/2018 | Swaminathan et al. | |
| 2018/0261186 A1 | 9/2018 | Watson et al. | |
| 2018/0352041 A1 | 12/2018 | Tasdemiroglu et al. | |
| 2019/0066157 A1 | 2/2019 | Shahid et al. | |
| 2019/0138260 A1 | 5/2019 | Rogers et al. | |
| 2019/0179405 A1 | 6/2019 | Sun et al. | |
| 2019/0188672 A1 | 6/2019 | Charles et al. | |
| 2019/0244248 A1 | 8/2019 | Purves et al. | |
| 2019/0251719 A1 | 8/2019 | Wang et al. | |
| 2019/0316916 A1 | 10/2019 | Perry | |
| 2020/0082423 A1 | 3/2020 | Glazier et al. | |
| 2020/0219167 A1 | 7/2020 | Jikomes et al. | |
| 2020/0302480 A1 | 9/2020 | Busch | |
| 2020/0387887 A1 | 12/2020 | Rathod | |
| 2021/0103975 A1 | 4/2021 | Walters et al. | |
| 2023/0294293 A1 | 9/2023 | Tosswill et al. | |

OTHER PUBLICATIONS

Daniel V. de Macedo, Maria Andréia F. Rodrigues, João J.V.P. Furtado, Elizabeth S. Furtado & Daniel A. Chagas (2014) Using and Evaluating Augmented Reality for Mobile Data Visualization in Real Estate Classified Ads, International Journal of Computers and Applications, 36:1, 7-14 (Year: 2014).*

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Feb. 17, 2021.

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Mar. 3, 2021.

Meawad, "InterAKT: A Mobile Augmented Reality Browser for Geo-Social Mashups," 2016 4th International Conference on User Science and Engineering (i-USEr). IEEE, 2016. (Year: 2016).

* cited by examiner

SYSTEM FOR INTERACTION REGARDING REAL ESTATE SALES

CROSS REFERENCE TO RELATED APPLICATION

This application is a continuation of U.S. patent application entitled "SYSTEM FOR INTERACTION REGARDING REAL ESTATE SALES," Ser. No. 16/738,284, filed Jan. 9, 2020, which claims priority to U.S. Provisional Patent Application entitled "SYSTEM FOR INTERACTION REGARDING REAL ESTATE SALES," Ser. No. 62/790,243, filed Jan. 9, 2019, the disclosures of which are hereby incorporated entirely herein by reference.

BACKGROUND OF THE INVENTION

Technical Field

This invention generally relates to real estate sales systems, and specifically to a system for interaction regarding real estate for sale or rent allowing users to post comments regarding a property that is geo-based for that property, which may be provided in a mixed reality system.

State of the Art

Individuals seeking to purchase a home or other type of real estate, either residential or commercial, often go to the location in order to see what the property looks like, what the community looks like and performs research regarding the area and the like. These purchasers are seeking for information about the property and all things around the property that may have an effect on how the purchaser enjoys or utilizes the property. Generally, this information is located in different places, such as different webpages and the like, and it is difficult for others to interact or to see the comments from others in the area, others who have looked at the property, and the like.

Accordingly, what is needed is a system for interaction regarding real estate sales.

SUMMARY OF THE INVENTION

An embodiment includes a system for interaction regarding real estate sales, the system comprising: a server having a memory storing geo-grouped property data; and a user computing device coupled to the server, wherein the server is programmed to: receive location information from the user computing device; automatically process the location information and determine what properties have a geolocation near the geolocation of the user computing device; automatically find and retrieve geo-grouped property data 26 corresponding to the properties near the geolocation of the user computing device; automatically deliver the geo-grouped data to the user computing device for access, wherein the geo-grouped data is viewable as floating bubbles over each property such as in a mixed reality environment displayed on the screen of the user computing device. For example, listings near the user computing device may be shown on the user computing device with floating identifiers, such as bubbles with the geo-grouped property data 26. The server may also be programmed to receive and store a post from the user computing device, wherein the post from the user is stored as part of the geo-grouped property data.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a system for interaction regarding real estate sales based on geolocation wherein geo-grouped property data corresponding to a geolocation of the property is accessible to a prospective purchaser operating a mobile application on a user computing device with a location within a predetermined distance from the geolocation of the property. The system may include the use of a mobile application operating on a user computing device that may be a mobile computing device like a smartphone, a tablet, a wearable, and the like. In embodiments, the user computing device may display floating identifiers, such as bubbles of geo-grouped property data regarding certain properties to be locationally associated with the certain properties, floating above the properties and accessible by user computing devices.

Figure 1:
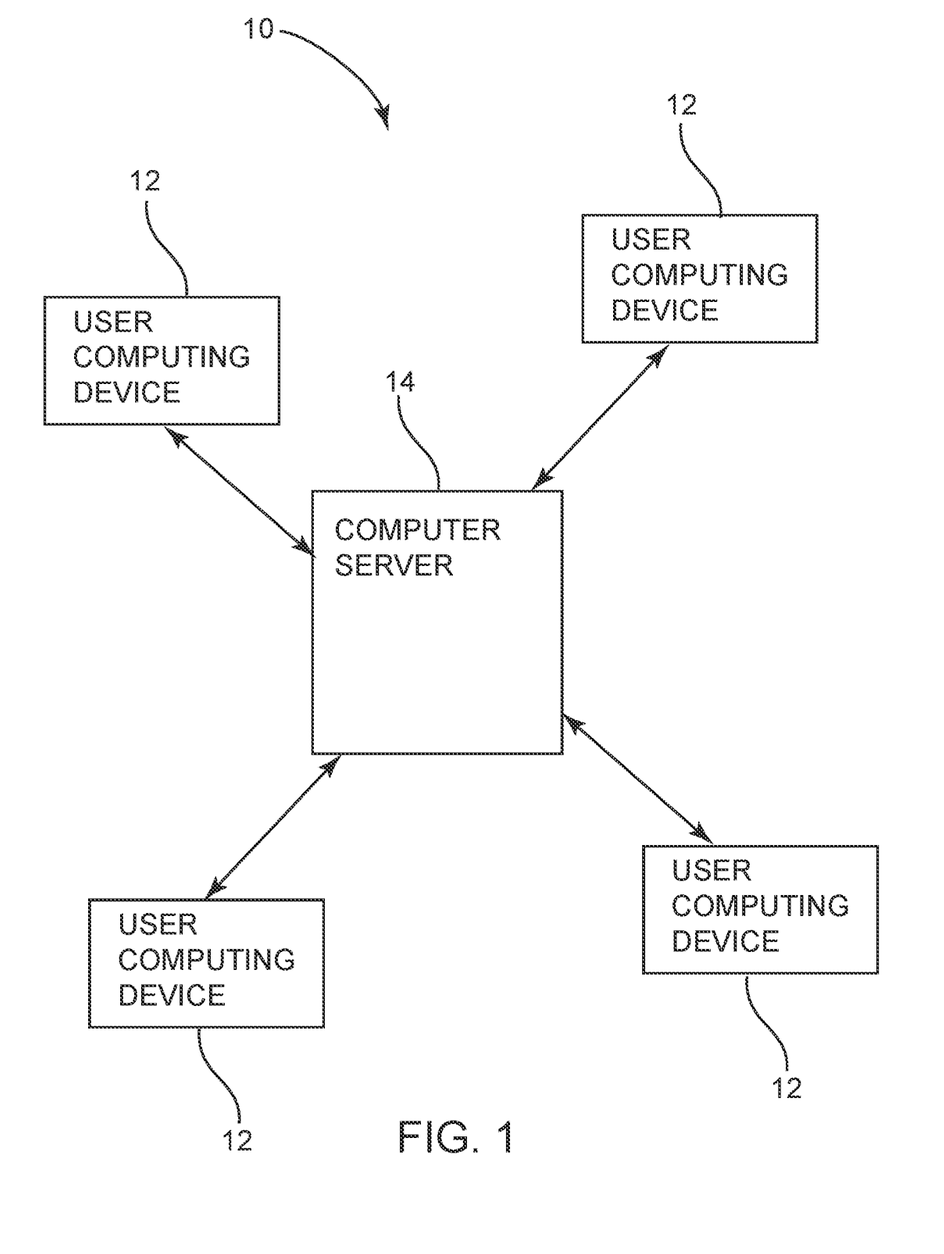
FIG. 1 a diagrammatic view of a system for interaction regarding real estate sales based on geolocation according to an embodiment.
Figure 2:
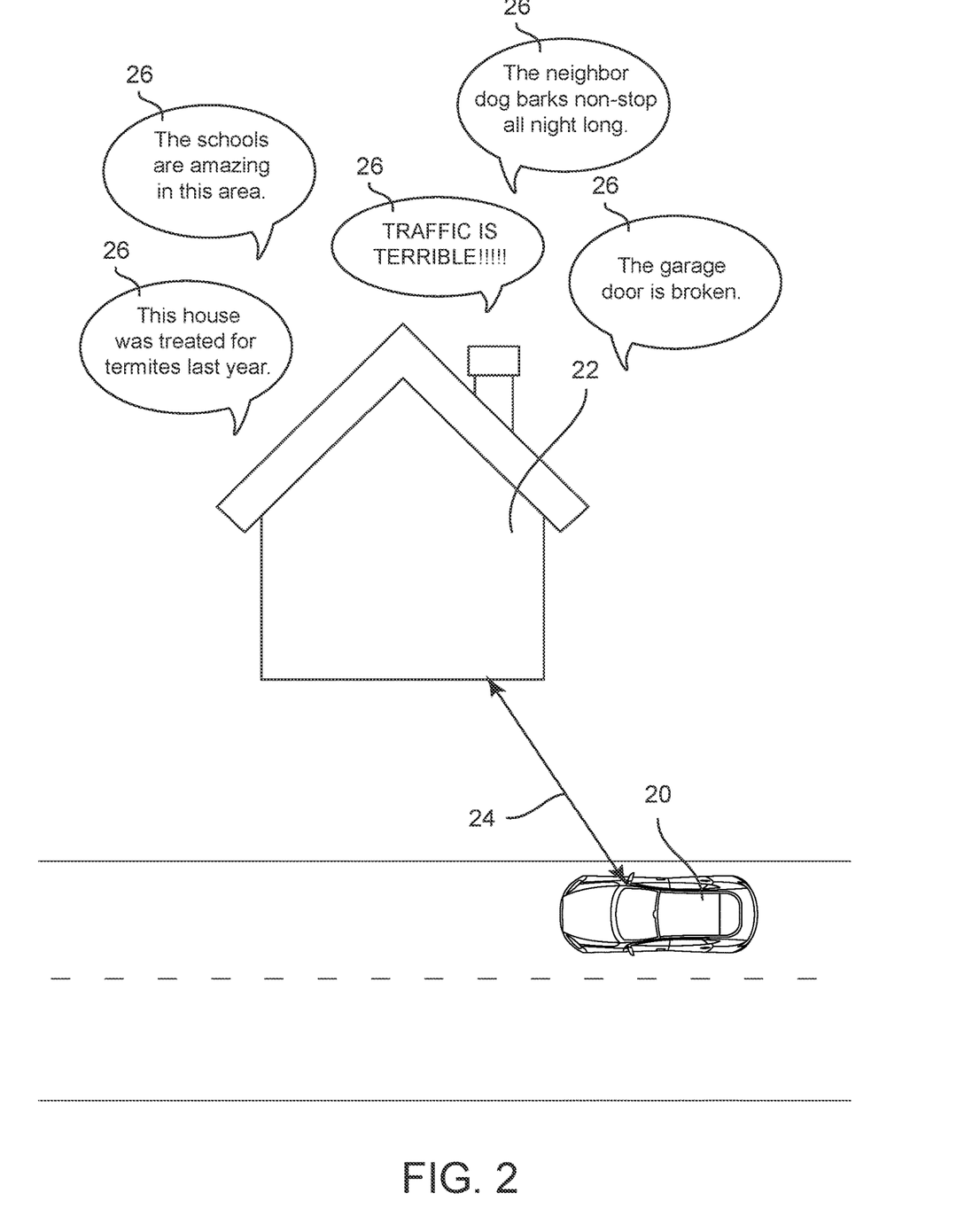
FIG. 2 depicts a system for interaction regarding real estate sales based on geolocation used by an occupant of a vehicle that is a predetermined distance from a geolocation of a property according to an embodiment.
Figure 3:
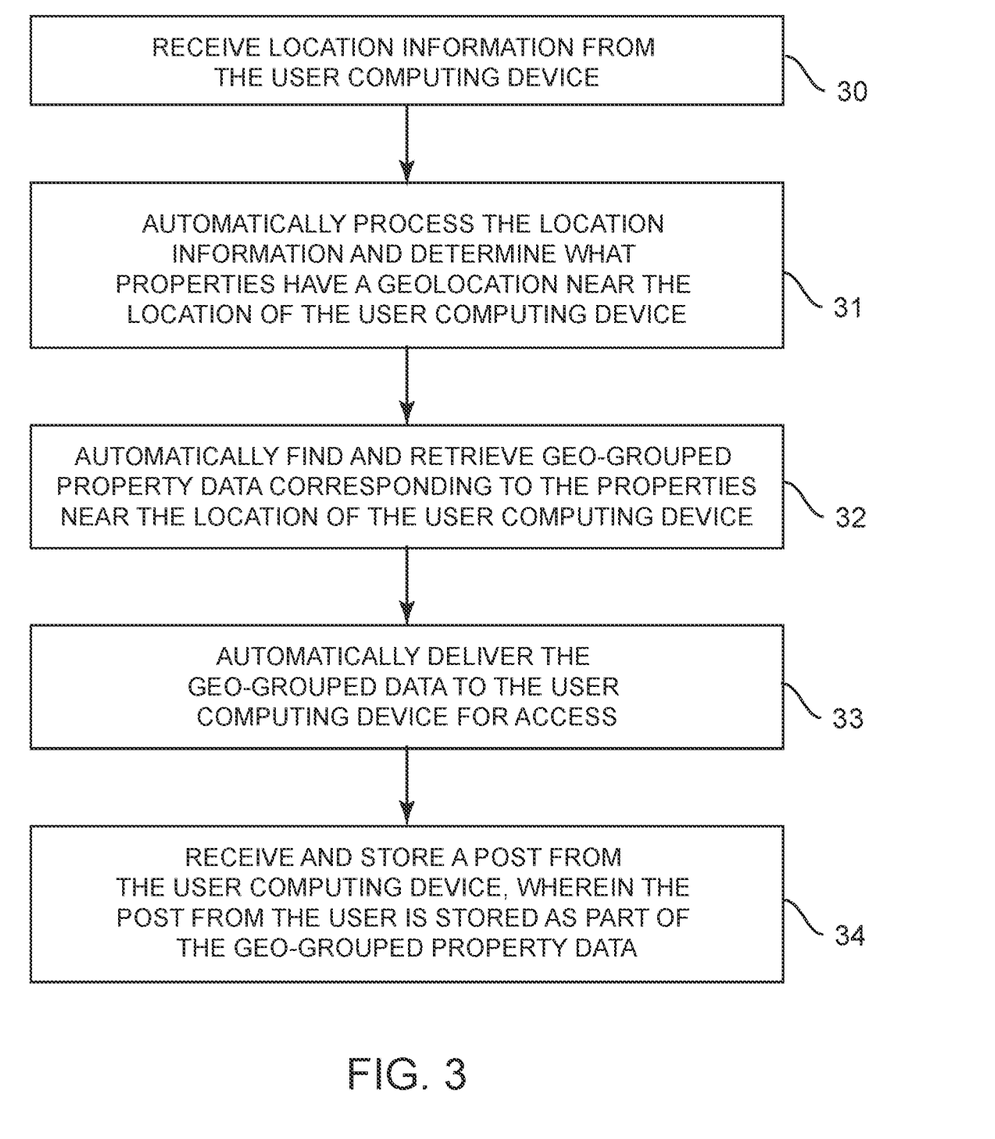
FIG. 3 is a flowchart of programmed instructions executed by a server of a system for interaction regarding real estate sales based on geolocation according to an embodiment.

FIGS. 1-3 show an embodiment of a system 10 for interaction regarding real estate sales based on geolocation. FIG. 1 shows a diagram of a system 10 for interaction regarding real estate sales based on geolocation. FIG. 2 depicts a system 10 for interaction regarding real estate sales based on geolocation used by a prospective purchaser in a vehicle, such as a car, a bus, a train or the like, walking or other form of transportation. FIG. 3 shows a flow chart of programming of a system 10 for interaction regarding real estate sales based on geolocation. In embodiments, a user includes a driver, a passenger or the like in any type of vehicle, and further may include an individual walking, riding a bike, riding a scooter, or any other form of moving from one location to another location.

FIG. 1 depicts an embodiment of a system 10 for interaction regarding real estate sales based on geolocation. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a computer server or a cloud-based infrastructure architecture.

The server 14 may include a memory storing various data. The memory of the server 14 may store posts and location information corresponding to a particular property, wherein location information for a property is associated with each post regarding the property and stored as a geo-grouped property data. In other words, the posts regarding a particular property are grouped together based on the geolocation of the property and are accessible to all users of the system 10 regardless of any separate association of users.

The user computing device 12 may be coupled to the server 14, and, referring to FIGS. 2 and 3, the server 14 may be programmed to receive location information from the user computing device (Step 30); automatically process the location information and determine what properties have a geolocation near the geolocation of the user computing device (Step 31); automatically find and retrieve geo-grouped property data 26 corresponding to the properties near the geolocation of the user computing device (Step 32); automatically deliver the geo-grouped data 26 to the user computing device for display and access (Step 33); and receive and store a post from the user computing device, wherein the post from the user is stored as part of the geo-grouped property data 26 (Step 34). In some embodiments, the user computing device 12 may be utilized by an occupant of a vehicle 20 (See FIG. 2). The user computing device 12 may be operating a mobile app as part of the system 10, wherein operation of the mobile app couples the user computing device 12 to the server 14. The user computing device 12 operating the mobile app, may further be operated to determine its location and send the location data to the server through the established connection. This location data, for example, may be location data obtainable by a smartphone and then sent to the server 14.

As shown in FIG. 2, the user computing device 12 may be within vehicle 20 and the location may be sent to the server 14. The location may be within a predetermined distance 24 of the geolocation of the property 22, thereby initiating the sending of geo-grouped property data 26 corresponding to the geolocation of the property 22 to the user computing device 12 within the vehicle 20.

Once the geo-grouped property data 26 is sent to the user computing device 12, the geo-grouped property data 26 is automatically displayed. In some embodiments, there may be several properties that are available based on the location of the user computing device 12. In these instances, the server 14 may be programmed to send a list of geo-grouped property data to the user computing device 12 for selection. The list may include different properties, wherein the user may select a desired geo-grouped property data associated with a desired property to access on the user computing device 12. Further still, the server 14 may also be programmed to send a list of geo-grouped property data to the user computing device for selection, the list including different content types of geo-grouped property data of the property or multiple properties. The different content types of geo-grouped property data may include text comments by other users, photos, graphics, videos, audio and the like. In embodiments, the server 14 may be programmed to supply lists for both multiple properties and different types of content associated with the multiple properties to the user computing device 12 for selection by the user.

Figure 4:
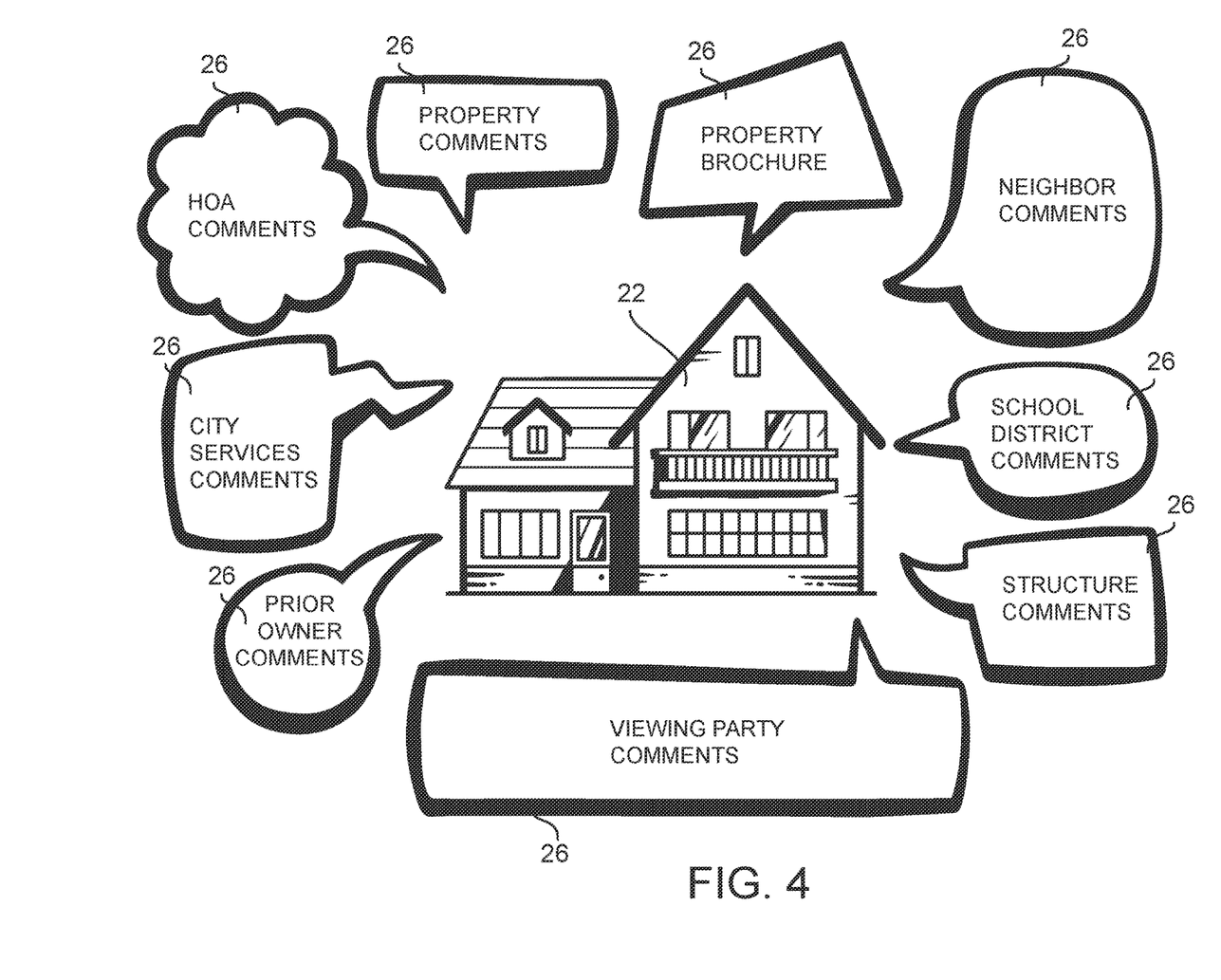
FIG. 4 depicts a system for interaction regarding real estate sales based on geolocation with bubbles of data having differing sizes according to an embodiment.
Figure 5:
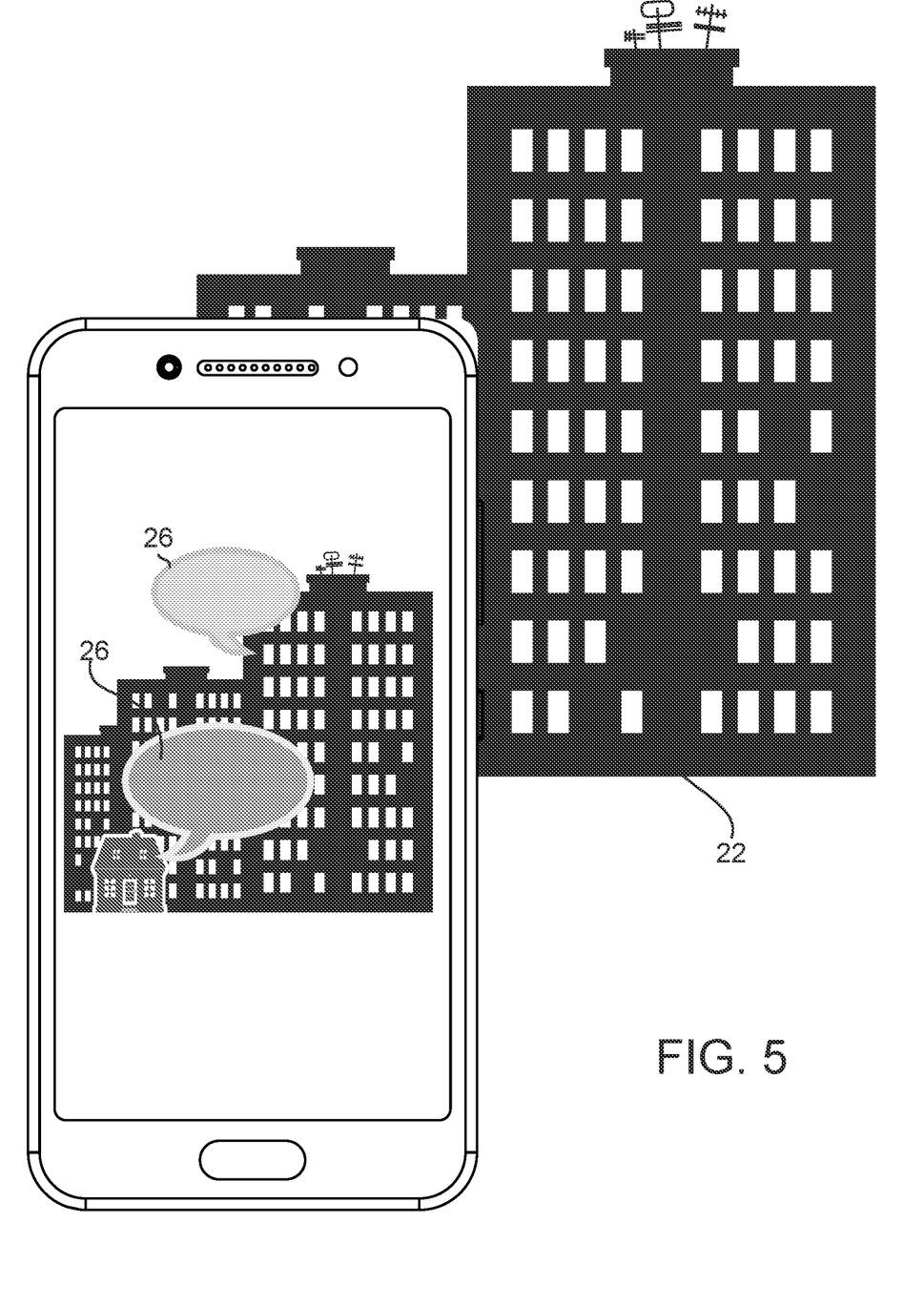
FIG. 5 depicts a system for social interaction regarding features based on geolocation in an augmented reality or a mixed reality environment according to an embodiment.
Figure 6:
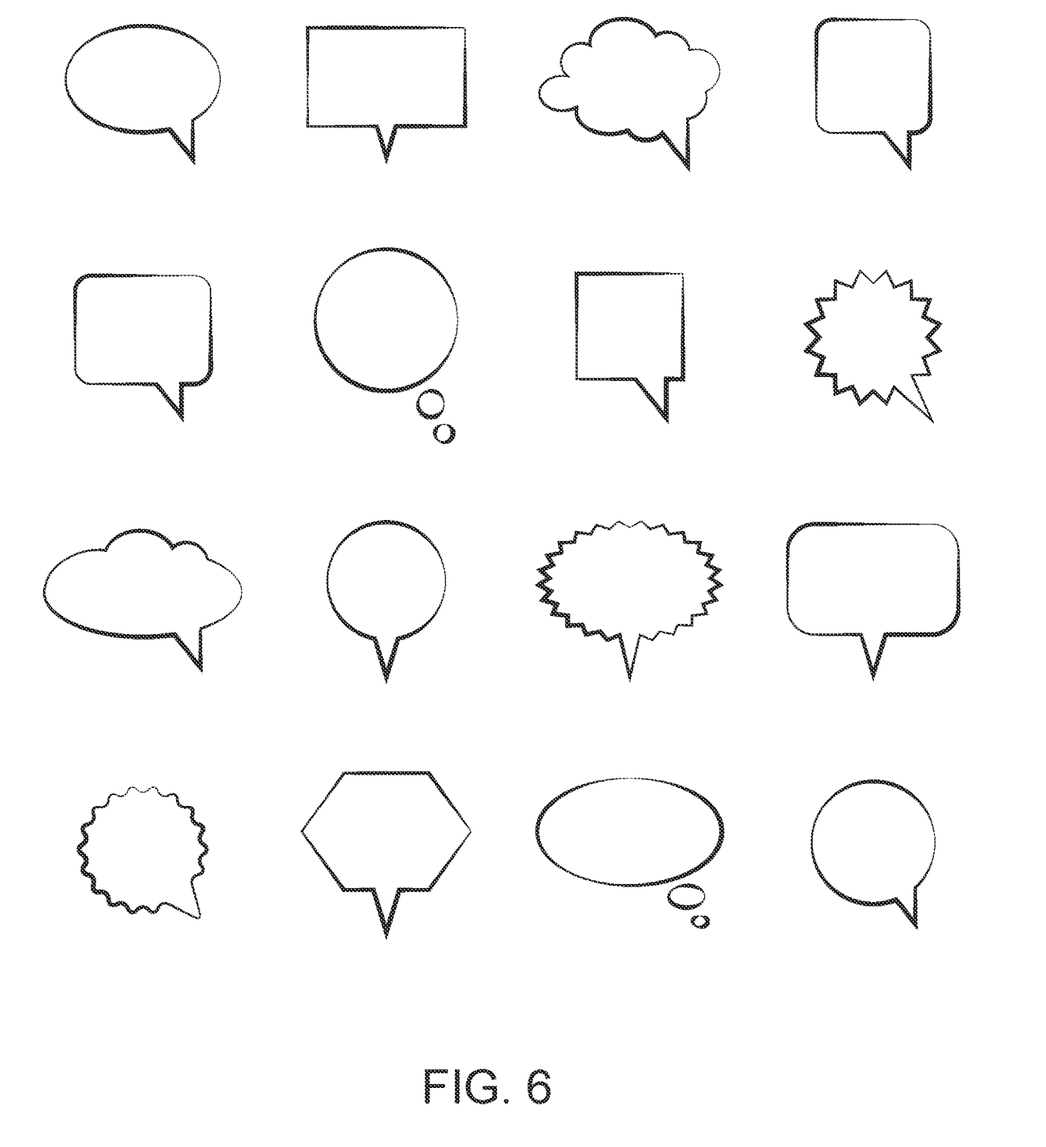
FIG. 6 depicts a various bubble shapes for use in a system for social interaction regarding features based on geolocation according to an embodiment.

It will be understood that the geo-grouped property data may be displayed as bubbles of data floating above each property in a mixed reality environment on the user computing device 12, wherein the bubbles are selectable on the user computing device 12 in order to access the information. In embodiments, the bubbles of data may be differentiated on the display of the user computing device 12 to indicate various types and amounts of data. For example, and not by way of limitation, the bubbles may be different colors to differentiate between the type of content of a property. Further, the bubbles may be different sizes to differentiate between amounts of content, wherein the greater amount of content results in bigger bubbles viewable on the user computing device, as shown in FIG. 4. Other distinctions between bubble of data displayed on the user computing device may be made for purposes, such as, but not limited to, bubbles with photos, bubbles with video, bubbles with text, bubbles with combinations of text/photo/video, and the like (See FIGS. 4-8).

Figure 7:
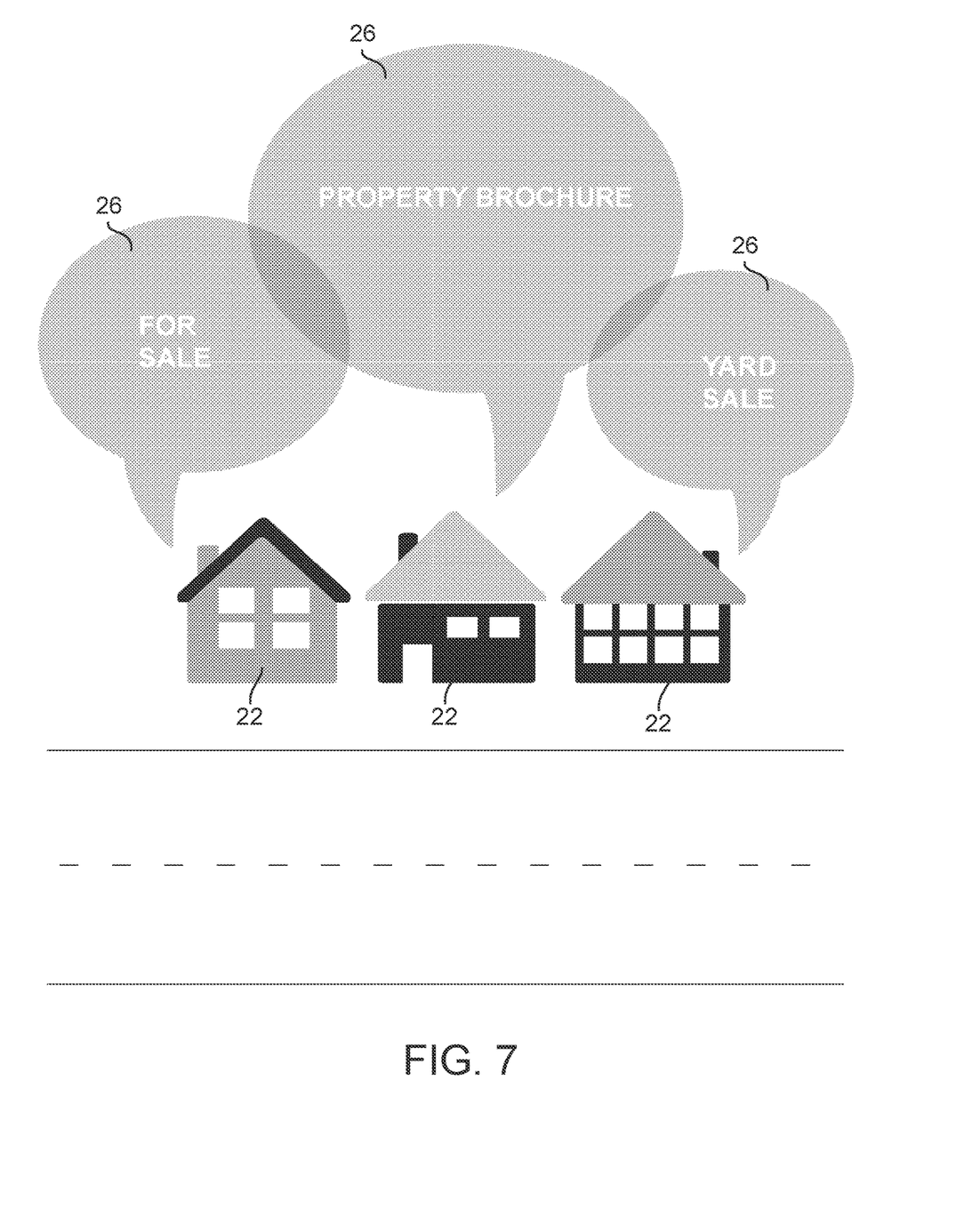
FIG. 7 depicts a system for interaction regarding real estate sales based on geolocation with bubbles of data having differing sizes according to an embodiment.
Figure 8:
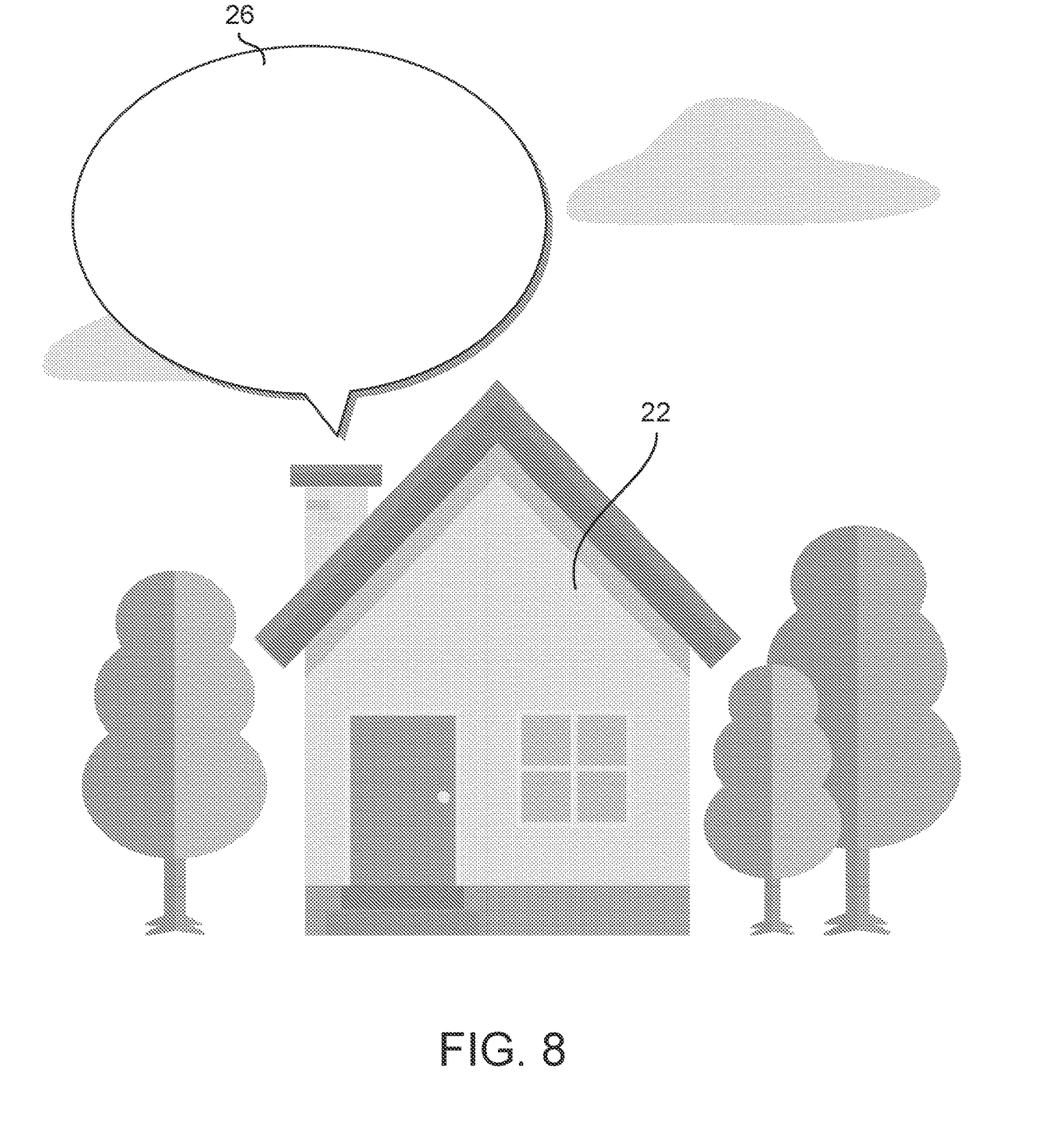
FIG. 8 depicts a system for interaction regarding real estate sales based on geolocation with bubbles of data having differing sizes according to an embodiment.

Referring to FIGS. 2, 4 and 7, the types of comments may include details about the property, particularly information that is not generally known or available using conventional real estate listing systems. For example, and without limitation, the information may include traffic information; noise information; information about previous owners, such as deaths in the home, floods, damage and the like; information regarding neighbor pets; information regarding a home owners association; and the like. As comments are entered regarding a property, the system may assign a score taking into account the amount of information in the geo-grouped property data, but also the variety of information and assign a gossip score for the property. The gossip score may be provided to the system as a data bubble, wherein users can readily see what properties have higher amount and variety of posts relating to the property.

Further, the geo-grouped property data 26 may further include content that would be equivalent to a property brochure that lists details of the property including size, year built, upgrades, and the like that are typically provided in property brochures. In these embodiments, as a user selects the property brochure content, it is a direct access download of information or file to the user computing device for review by a user. This can be in addition to the other comments regarding the property. This would be a replacement of conventional brochures posted or available in sign outside of the residence. It does not require the potential purchaser to get out of his or her vehicle to obtain the brochure and may be updated easily by updating a digital file. This brochure information may be in addition to anecdotal information that may be posted by neighbors, previous owner and others that have viewed the property.

It is contemplated that a user that is a driver of a vehicle may elect to receive the geo-grouped property data in a form that complies with state driving laws, while passengers may have the same or alternative feeds of information.

By way of example only, and not as a limitation, operation of the system 10 may include a user traveling by a certain property while house hunting. The user is operating a user computing device 12 that is the user's smartphone operating a mobile application to access the system 10. The location information of the user computing device 12 is automatically being sent to the server at intervals or continuously. The server 14 process the information to determine that the user is within a predetermined distance of a geolocation of a certain property. The server 14 automatically send the geo-grouped property data 26 to the user computing device 12 for display and access by the user. The geo-grouped property data 26 may be provided as bubbles of data including text, photos, videos and the like of all users that have posted regarding the certain property in a mixed reality environment displayed on a screen of the user computing device. For example, listings near the user computing device may be shown on the user computing device with floating identifiers, such as bubbles with the geo-grouped property data 26. The user may consume the geo-grouped property data 26 by selecting the bubbles of data on the user computing device to view and/or read the geo-grouped property data 26. The user may further submit a post on the certain property, wherein the post of the user will automatically be added to the geo-grouped property data 26 for access and consumption by all other users of the system by including the post of the user as part of or another bubble of data. In embodiments, multiple users within the predetermined distance of the geolocation of the same property may post/comment back and forth in real time or in near real time regarding the property. Visually presented, the system 10 allows for bubbles of data regarding certain properties to be geolocationally associated with the certain properties and displayed as floating above the property in order to be accessible by user computing devices 12 within a certain proximity of the geolocation of the certain properties. It allows interaction with individuals who have a common interest in the properties and surrounding community and the like.

In other embodiments, the geo-grouped property data may be displayed as a camera lens coupled to the user computing device 12 pans and views the property with the camera lens and displays the geo-grouped property data floating or otherwise associated with the property. In other words, as a camera lens coupled to the user computing device is panned, the properties that are in the viewing sight of the camera lens may be displayed on the screen of the user computing device with floating identifiers of geo-grouped property data 26 above the properties 22.

Embodiments may be available on or through the internet, such as through domain names reserved and owned by Applicant that include gossipscore.com, chataddress.com, geobrochure.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A system for interaction regarding real estate sales based on geolocation, the system comprising:
a server having a memory storing geo-grouped property data;
a plurality of user computing devices coupled to the server; and
a first user computing device comprising a camera, the first user computing device coupled to the server, wherein the server is programmed to:
receive and store from the plurality of user computing devices posts and location information associated with the posts corresponding to a particular property, wherein the posts from the plurality of user computing device is stored as part of the geo-grouped property data;
receive location information from the first user computing device, wherein the first user computing device operates a mobile application, wherein operation of the mobile application establishes a communication connection between the first computing device and the server, and determines a location of the at least one user computing device and sends the location information comprising the location of the first user computing device to the server through the communication connection between the first user computing device and the server;
automatically process the location information and determine what properties have a geolocation near the geolocation of the first user computing device;
automatically find and retrieve, from the memory, geo-grouped property data corresponding to the properties near the geolocation of the first user computing device;
automatically deliver an indicator of the geo-grouped property data to the first user computing device in response to the first user computing device being within a predetermined distance of the properties corresponding to the geo-grouped property data, wherein the first user computing device displays the properties and each indicator of geo-grouped property data associated with each of the properties is in a form of a floating bubble proximate the display of the corresponding property with which it is associated, wherein the floating bubble is selectable on the user computing device in order to access the geo-grouped property data, wherein the display of the corresponding property with which the floating bubble is displayed is a part of an augmented reality environment displayed on the first user computing device as a lens of the camera views the properties, wherein the floating bubbles are different sizes to differentiate between an amount of posts, and wherein greater the amount of posts results in a bigger size of the floating bubble viewable on the first user computing device and the floating bubbles are different colors and different shapes to differentiate between content types, wherein the floating bubbles are a first color and a first shape for floating bubbles having only text content and the floating bubbles are a second color and a second shape for floating bubbles having text and other media content;
in response to selecting the floating bubble indicator, sending the geo-grouped property data for display on the first user computing device;
delivering, in real time, comments back and forth associated with the property by a portion of the user computing devices of the plurality of computing devices having a location within the predetermined distance of the property, the comments delivered via the server through established connections; and
assign a gossip score to each property for which geo-grouped property data is stored in the server, wherein the gossip score represents a quantifiable value corresponding to the quantity of data, the variety of data, or a combination thereof, associated with the property, and the data may include information about traffic, noise, previous owners, and neighbors, wherein the gossip score is higher for a higher quantity and/or variety of data.

2. The system for interaction regarding real estate sales of claim 1, wherein the first user computing device is located within a vehicle and is operable by a user within the vehicle.

3. The system for interaction regarding real estate sales of claim 1, wherein the geo-grouped data is automatically displayed on the first user computing device.

4. The system for interaction regarding real estate sales of claim 1, wherein the server is further programmed to send, to the first user computing device, a list of the properties corresponding to the geo-grouped data delivered to the first computing device, wherein the user may select from the list a desired geo-grouped property data associated with a desired property to access on the first user computing device.

5. The system for interaction regarding real estate sales of claim 4, wherein the list of the properties corresponding to the geo-grouped data further comprises a plurality of content types of geo-grouped property data associated with each property, respectively, wherein the user may select from the plurality of content types of geo-grouped property data to access on the user computing device.

6. The system for interaction regarding real estate sales of claim 5, wherein each of the plurality of content types of geo-grouped property data includes information selected from the group of information consisting of traffic information, noise information, previous owner information, neighbor pets information, and home owners association information, wherein the previous owner information includes at least one type of previous owner information taken from the group of previous owner information types consisting of information regarding deaths in the home, information regarding floods of the home, and information regarding damage to the home.

7. The system for interaction regarding real estate sales of claim 1, wherein the gossip score, of each property displayed, is automatically displayed as one of the floating bubbles proximate the display of the property with which it is associated.

8. The system for interaction regarding real estate sales of claim 7, wherein the geo-grouped property data further comprises at least one property brochure listing details of a property for which geo-grouped property data is stored on the server, wherein the at least one property brochure is accessible by direct download to the first user computing device as downloadable information or as a downloadable file.

9. The system for interaction regarding real estate sales of claim 8, wherein the at least one property brochure contains at least one property detail selected from the group of property details consisting of the property size, the year the property was built, and property upgrades.

* * * * *